US008669119B2

(12) United States Patent
Segev et al.

(10) Patent No.: US 8,669,119 B2
(45) Date of Patent: Mar. 11, 2014

(54) METHOD AND SYSTEM FOR MANIPULATING FLUID MEDIUM

(75) Inventors: Mordechai Segev, Haifa (IL); Demetrios N. Christodoulides, Casselberry, FL (US); Carmel Rotschild, Ganei Tikva (IL)

(73) Assignee: Technion Research & Development Foundation Limited, Haifa (IL)

( * ) Notice: Subject to any disclaimer, the term of this patent is extended or adjusted under 35 U.S.C. 154(b) by 348 days.

(21) Appl. No.: 12/935,003

(22) PCT Filed: Mar. 25, 2009

(86) PCT No.: PCT/IL2009/000338
§ 371 (c)(1), (2), (4) Date: Sep. 28, 2010

(87) PCT Pub. No.: WO2009/122399
PCT Pub. Date: Oct. 8, 2009

(65) Prior Publication Data

US 2011/0023973 A1 Feb. 3, 2011

Related U.S. Application Data

(60) Provisional application No. 61/041,113, filed on Mar. 31, 2008.

(51) Int. Cl.
*F04B 19/00* (2006.01)
*G02B 26/00* (2006.01)

(52) U.S. Cl.
USPC .......................................... 436/180; 422/505

(58) Field of Classification Search
USPC .................. 422/504, 505, 507, 502; 436/180
See application file for complete search history.

(56) References Cited

U.S. PATENT DOCUMENTS

2004/0036130 A1 2/2004 Lee et al.

FOREIGN PATENT DOCUMENTS

| | | |
|---|---|---|
| WO | WO 2004/016948 | 2/2004 |
| WO | WO 2006/099494 | 9/2006 |
| WO | WO 2006099494 A2 * | 9/2006 |
| WO | WO 2009/122399 | 10/2009 |

OTHER PUBLICATIONS

International Preliminary Report on Patentability Dated Oct. 14, 2010 From the International Bureau of WIPO Re. Application No. PCT/IL2009/000338.

International Search Report Dated Aug. 7, 2009 From the International Searching Authority Re.: Application No. PCT/IL2009/000338.

Written Opinion Dated Aug. 7, 2009 From the International Searching Authority Re.: Application No. PCT/IL2009/000338.

Belov et al. "Nonlinear Scattering and Self-Focusing of Laser Radiation in an Aerosol", Soviet Journal of Quantum Electronics, XP008108343, 15(8): 1150-1151, Aug. 1, 1985.

(Continued)

*Primary Examiner* — Christopher A Hixson

(57) ABSTRACT

A system for manipulating a fluid medium is disclosed. The system comprises a plurality of particles suspended in the fluid medium, and a light source configured for irradiating the particles by light to induce nonlinear optical effects. The particles are constituted such that the nonlinear optical effects result in drag forces exerted by the particles on the fluid medium. The magnitude of the drag forces is sufficient to establish hydrodynamic flow of the fluid medium.

31 Claims, 4 Drawing Sheets
(3 of 4 Drawing Sheet(s) Filed in Color)

(56) References Cited

OTHER PUBLICATIONS

Lee et al. "Optofluidics Technology Based on Colloids and Their Assemblies", Microfluidics and Nanofluidics, XP019547450, 4(1-2): 129-144, Aug. 22, 2007.

Neale et al. "All-Optical Control of Microfluidic Components Using Form Birefringence", Nature Materials, XP002538512, 4: 530-533, Jun. 19, 2005.

Psaltis et al. "Developing Optofluidic Technology Through the Fusion of Microfluidics and Optics", Nature, XP002538511, 442: 381-386, Jul. 27, 2006. p. 385, 386.

Sato "Optical Trapping and Manipulation of Microscopic Particles and Biological Cells by Laser Beams", Optical and Quantum Electronics, XP008108540.

* cited by examiner

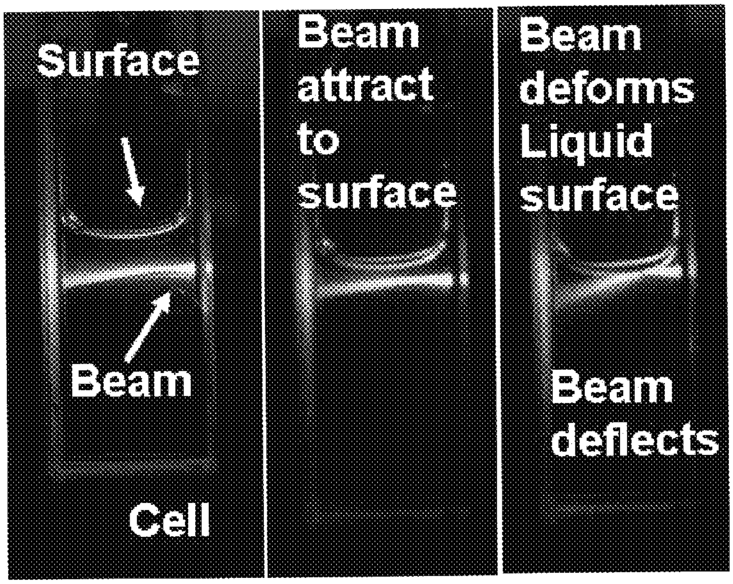
FIG. 5A FIG. 5B FIG. 5C
FIG. 6
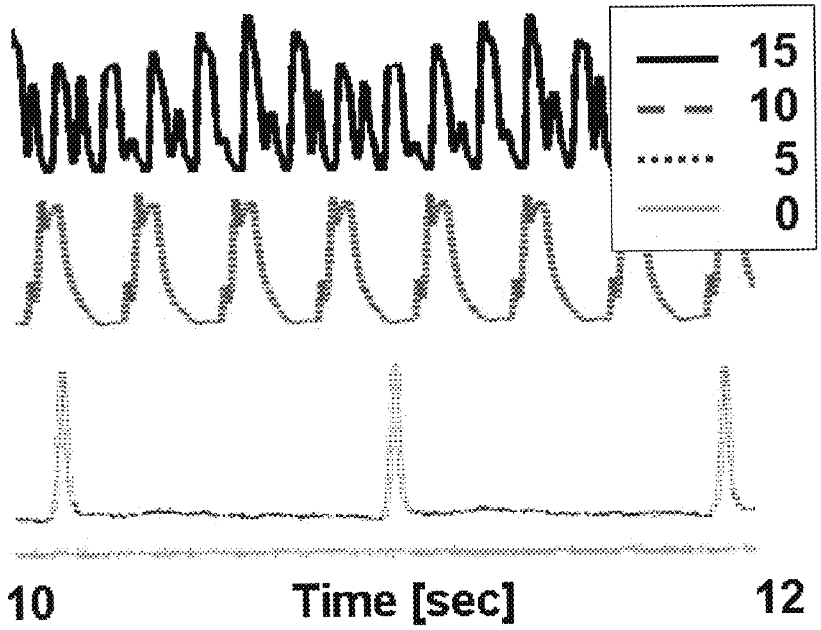

METHOD AND SYSTEM FOR MANIPULATING FLUID MEDIUM

RELATED APPLICATION/S

This application is a National Phase of PCT Patent Application No. PCT/IL2009/000338 having International filing date of Mar. 25, 2009, which claims the benefit of priority from U.S. Provisional Patent Application No. 61/041,113 filed Mar. 31, 2008. The contents of the above applications are hereby incorporated by reference as if fully set forth herein.

FIELD AND BACKGROUND OF THE INVENTION

The present invention, in some embodiments thereof, relates to the manipulation of a fluidic medium and, more particularly, but not exclusively, to the manipulation of a fluidic medium by light.

Manipulation of liquid, particularly in microchannels, has to attracted research and industrial attention for many years. For example, U.S. Pat. No. 6,294,063 to Becker et al. describes microfluidic devices that manipulate packets of fluids through the application of electric fields via electrodes located on the devices. A fluid is introduced onto a reaction surface and compartmentalized to form a packet. An adjustable programmable manipulation force is applied to the packet according to the position of the packet. As a result, the packet is moved according to the manipulation force. In some cases, electromagnetic radiation may be used to maintain photochemical reaction or for sensing processes.

Also known are techniques which rely on the ability of electric fields to change the contact angle of a fluid on a surface. For example, application of electric field gradient to a droplet on a fluid-transporting surface, to form different contact angles between leading and receding surfaces of the droplet with respect to the fluid-transporting surface, hence to cause imbalance in surface tension forces which produces a net force and move the droplet [Lee et al. (2002), "Electrowetting and electrowetting-on-dielectric for microscale liquid handling," Sensors and Actuators A 95:259-268]. Another example is the use of a particular surface polymer layer which changes its isomeric form once being exposed to ultraviolet or blue light. This change of isomeric form changes the contact angle between the polymer layer and a macroscopic droplet placed thereon [Ichimura et al. (2000), "Light-driven motion of liquids on a photoresponsive surface," Science 288:1624-1626].

Optical trapping is a phenomenon in which items such as atoms, molecules and small particles are manipulated by light. The fundamental principle behind optical trapping is that light carries momentum, which can then be expressed as radiation pressure. When light is absorbed, reflected or refracted by a material, momentum is transferred to the material.

One type of optical trap is a single-beam gradient trap, also known as "optical tweezers". A laser beam is focused on the particles which are typically in a liquid medium on a microscope slide.

U.S. Pat. Nos. 3,710,279 and 3,808,550 to Askin disclose a variety apparatus for controlling by radiation pressure the motion of particle, such as a neutral biological particle, free to move with respect to its environment. U.S. Pat. No. 4,893,886 to Ashkin, et al. discloses biological particles such as cells, bacteria, and viruses, which are successfully trapped in a single-beam gradient force trap using an infrared laser. The high numerical aperture lens objective in the trap is also used for simultaneous viewing. Other exemplary applications of optical tweezers technology include the immobilization of biomolecules such as DNA, RNA, proteins, lipids, carbohydrates, or hormones (see U.S. Pat. No. 6,139,831 to Shivashankar et al.).

U.S. Pat. No. 6,995,351 to Curtis et al. describes an implementation of dynamic holographic optical tweezers for producing many independent traps. Computer-generated diffractive optical elements are used for converting a single beam into multiple traps which in turn are used to form one or more optical vortices. The optical vortex technique is combined with the holographic optical tweezers technique to create multiple optical vortices in arbitrary configurations. The rotation induced in trapped particles by optical vortices is employed for forming an array of co-rotating rings of particles. The flow outside a ring of particles is used to pump fluids through small channels.

SUMMARY OF THE INVENTION

The background art fails to teach manipulation of a fluid medium via nonlinear optics. Although some attempts were made to use dynamic holographic optical tweezers for pumping liquid via an array of co-rotating rings of particles, these techniques are based on linear interaction between the particle and the light beam, and are therefore inefficient.

The present embodiments employ nonlinear optics for the manipulation of fluid medium. In nonlinear interaction, the light changes the distribution of the particles, resulting in a change of the refractive index of the bulk and consequently in a change of light propagation. The present embodiments successfully exploit the nonlinear interaction to optically control fluid dynamics both in the microscopic and macroscopic regimes.

According to an aspect of some embodiments of the present invention there is provided a system for manipulating a fluid medium. The system comprises: a plurality of particles suspended in the fluid medium, and a light source configured for irradiating the particles by light to induce nonlinear optical effects, the particles being constituted such that the nonlinear optical effects result in drag forces exerted by the particles on the fluid medium at a magnitude which is sufficient to establish hydrodynamic flow of the fluid medium.

According to an aspect of some embodiments of the present invention there is provided a method of manipulating a fluid medium. The method comprises irradiating particles suspended in the fluid medium by light to induce nonlinear optical effects, the particles being constituted such that the nonlinear optical effects result in drag forces exerted by the particles on the fluid medium at a magnitude which is sufficient to establish hydrodynamic flow of the fluid medium.

According to some embodiments of the invention at least a few of the particles have a surface area which is at least 2 times larger than a surface area of a sphere occupying the same volume.

According to some embodiments of the invention at least a few of the particles comprise a core and a plurality of elongated structures extending from the core.

According to some embodiments of the invention the elongated structures form a ligand layer surrounding the core.

According to some embodiments of the invention the particles comprise quantum dots.

According to some embodiments of the invention the drag forces are sufficient for varying a level of the fluid in a micropipette by at least 1 mm.

According to some embodiments of the invention at least a few of the particles are coated by a catalyst.

According to some embodiments of the invention at least a few of the particles are capable of self assembling, and the light locally controls a concentration of the particles thereby controlling self assembly structures formed by the particles.

According to some embodiments of the invention the light locally modifies a surface tension of the fluid medium.

According to some embodiments of the invention the light locally modifies at a viscosity of the fluid medium.

According to some embodiments of the invention the light locally modifies an evaporation temperature of the fluid medium.

According to some embodiments of the invention the light locally modifies a convection rate of the fluid medium.

According to some embodiments of the invention the light locally modifies an acidity of the fluid medium.

According to some embodiments of the invention the fluid medium comprises electrolyte and the light locally modifies a concentration of the electrolyte.

According to some embodiments of the invention the light induces surface waves or density waves within the fluid medium.

According to some embodiments of the invention the light induces turbulence in the fluid.

According to some embodiments of the invention the light modifies osmotic pressure at the vicinity of a membrane present in the fluid medium.

According to some embodiments of the invention the membrane is a biological membrane.

According to some embodiments of the invention the membrane is an artificial membrane.

According to some embodiments of the invention a heat transfer between the light and the fluid medium is below 2 degrees centigrade.

According to some embodiments of the invention the fluid is liquid.

According to some embodiments of the invention the liquid is a liquid drop in a channel, and the drag forces are sufficient for establishing locomotion of the liquid drop in the channel.

According to some embodiments of the invention the light modifies local concentration of gaseous bubbles present in the fluid medium.

According to some embodiments of the invention the fluid is gas.

According to some embodiments of the invention the light forms a predetermined three-dimensional particles concentration pattern within the fluid, the pattern being inputted from a computer readable medium.

According to an aspect of some embodiments of the present invention there is provided a method of controlling a chemical reaction. The method comprises introducing chemical agents into a fluid medium, and executing the method described herein so as to modify a rate of chemical reactions between the chemical agents.

According to an aspect of some embodiments of the present invention there is provided a method of controlling surface fabrication processes. The method comprises placing the surface in a fluid medium and executing the method described herein so as to control a local concentration of particles suspended in the fluid medium.

According to an aspect of some embodiments of the present invention there is provided a method of generating a soliton light beam. The method comprises executing the method described herein in a manner such that at least a portion of the light exits the fluid medium as a soliton light beam.

According to some embodiments of the invention the soliton light beam is a spatial soliton light beam.

According to some embodiments of the invention the soliton light beam is a spatio-temporal soliton light beam.

According to some embodiments of the invention the soliton light beam is a sub-wavelength soliton light beam.

According to an aspect of some embodiments of the present invention there is provided a microfluidic system. The system comprises at least one microchannel, a plurality of particles suspended in a liquid medium, and a light source for irradiating the particles as described herein.

According to an aspect of some embodiments of the present invention there is provided a system. The system comprises a liquid medium which comprises liquid and gaseous bubbles, and a light source configured for irradiating the gaseous bubbles by light to induce optical gradient forces via nonlinear optical effects, the optical gradient forces being sufficient to establish locomotion of the gaseous bubbles within the liquid.

According to an aspect of some embodiments of the present invention there is provided a method. The method comprises irradiating a liquid medium which comprises liquid and gaseous bubbles by light to induce optical gradient forces via nonlinear optical effects, the optical gradient forces being sufficient to establish locomotion of the gaseous bubbles within the liquid. According to some embodiments of the invention the nonlinear optical effects result in drag forces exerted by the gaseous bubbles on the liquid at a magnitude which is sufficient to establish hydrodynamic flow of the liquid.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a system for manipulating a fluid medium, according to some embodiments of the present invention;

FIG. 2 is schematic illustration of a microfluidic system, according to some embodiments of the present invention;

Figure 3A:
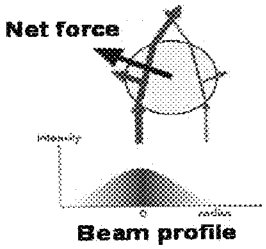
Figure 3B:
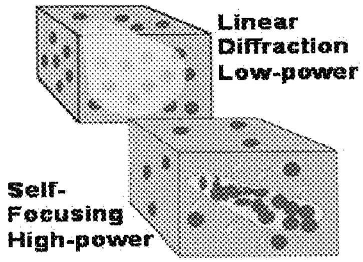
Figure 3C:
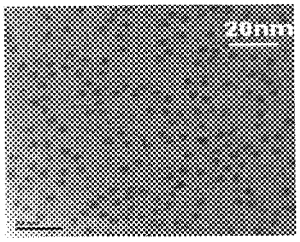

FIGS. 3A-C show an illustration of the optical gradient force (FIG. 3A), illustration of self-focusing versus linear diffraction (FIG. 3B), and an experimental TEM photograph of the dielectric nanoparticles (FIG. 3C).

FIGS. 4A-D are images demonstrating the effect of light intensity on height of liquid within a pipette.

FIGS. 5A-C are images demonstrating the effect of the distance between a light beam and a liquid-air surface on the height of liquid within a pipette.

FIG. 6 shows plots describing experimentally measured oscilloscope traces demonstrating a periodic motion of a light beam for several values of the distance between the beam center and liquid-air surface.

Figure 7:
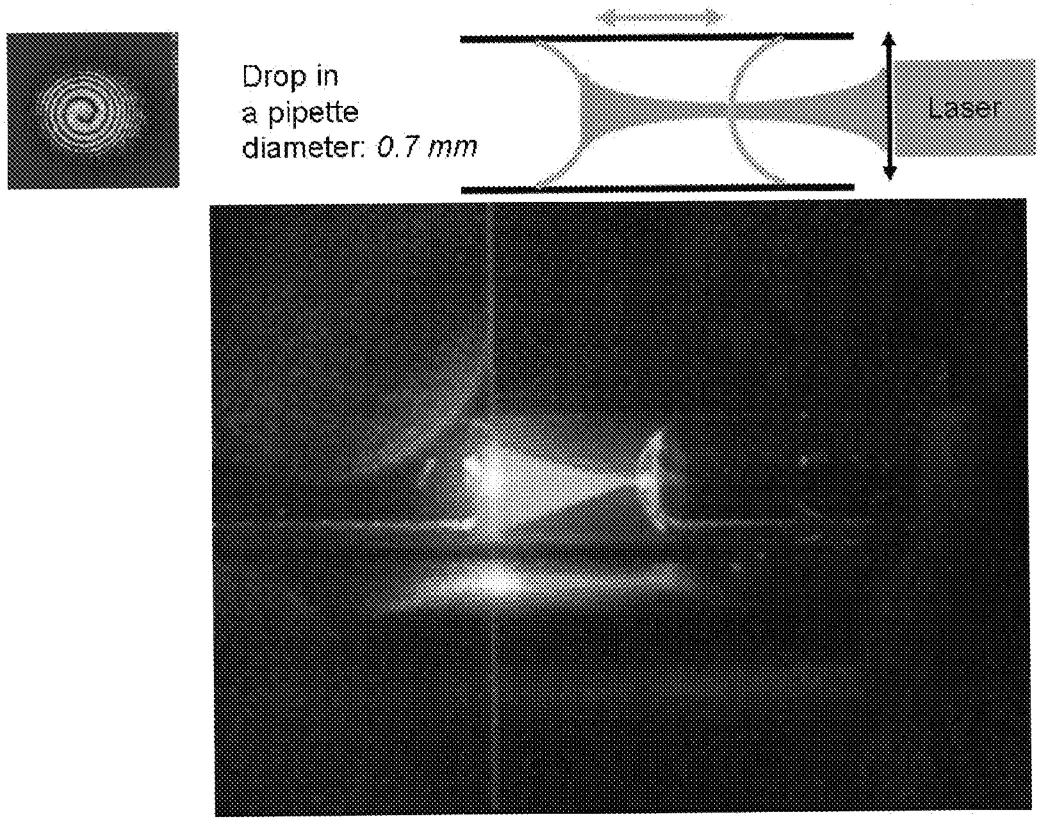

FIG. 7 shows an experiment in which light was used to move a liquid drop.

FIGS. 8A-D are images depicting an optical beam emerging from the liquid-particles composition.

DESCRIPTION OF SPECIFIC EMBODIMENTS OF THE INVENTION

The present invention, in some embodiments thereof, relates to the manipulation of a fluidic medium and, more particularly, but not exclusively, to the manipulation of a fluidic medium by light.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
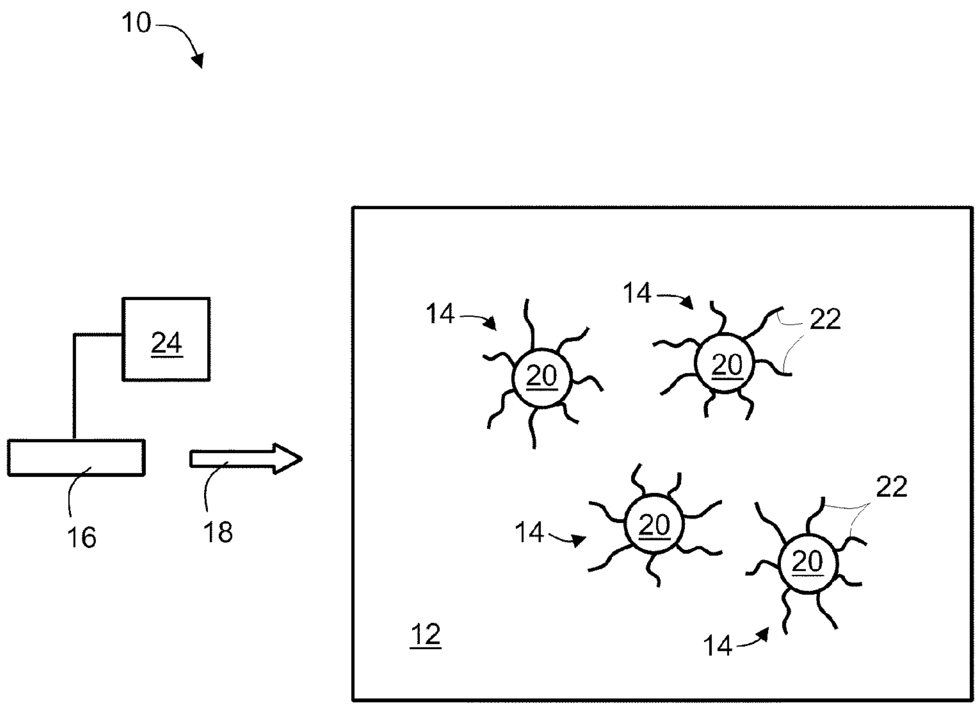

Referring now to the drawings, FIG. 1 illustrates a system 10 for manipulating a fluid medium 12 such as a liquid or gas, according to some embodiments of the present invention. System 10 comprises a plurality of particles 14 suspended in fluid medium 12, and a light source device 16, e.g., a laser device.

In use, light source device 16 irradiates the particles by light 18 to induce nonlinear optical effects, and specifically to establish nonlinear interaction between light 18 and particles 14, such that light 18 exerts optical intensity gradient forces on particles 14. Fluid medium 12 is preferably transparent to the wavelength of light 18.

As used herein, "nonlinear interaction" refers to an interaction between light and matter wherein the incident light changes the index of refraction of the matter, thereby affecting the properties of the light itself (e.g., frequency, intensity, phase). Nonlinear optical effects can be ensured by selecting a sufficiently intense light. Generally, the electrical field strength of the light is comparable to the characteristic intramolecular field strength of the matter.

Particles 14 are made of dielectric material characterized by a refractive index which is different from the refractive index of fluid medium 12. When the refractive index of particles 14 is higher than the refractive index of fluid medium 12, the nonlinear interaction between light 18 and particles 14 result in attractive gradient forces whereby particles 14 are pulled by light 18. When the refractive index of particles 14 is lower than the refractive index of fluid medium 12, the nonlinear interaction between light 18 and particles 14 result in repulsive gradient forces whereby particles 14 move away from the light.

In some embodiments, the differences in refractive indices is at least 0.5, more preferably at least 0.75, e.g., 1 or more. For example, the refractive index of particles 14 can be above 2.4 or above 2.5 or above 2.6 or above 2.7 and the refractive index of fluid medium 12 can be below 2 or below 1.8 or below 1.6. In any event, particles 14 are constituted such that the nonlinear interaction results in drag forces which are exerted by the particles on fluid 12. The magnitude of the drag forces is sufficient to establish hydrodynamic flow of fluid medium. In some embodiments of the present invention the drag forces are sufficient for varying a level of the fluid in a micropipette by at least 1 mm or at least 2 mm.

In various exemplary embodiments of the invention one or more of particles 14 has a surface area which is at least 2 times, more preferably at least 3 times, more preferably at least 4 times, more preferably at least 5 times, more preferably at least 10 times, more preferably at least 100 times larger than a surface area of a sphere occupying the same volume as particle 14. Sufficiently large surface area of the particles ensures a sufficiently high drag force magnitude.

In various exemplary embodiments of the invention one or more of the particles comprises a core 20 and a plurality of elongated structures 22 extending from core 20. For example, each elongated structure can be a surface ligand such that particles 14 comprise a core surrounded by a ligand layer.

The surface ligands can be elongated organic molecules. Core 20 may or may not also comprise a shell. As such, the surface ligands may bind, either convalently or non-covalently, to either the core or the shell material or both (in the case of an incomplete shell). The ligand layer may comprise a single type of surface ligand (e.g., a single molecular species) or a mixture of two or more types of surface ligands (e.g., two or more different molecular species). A surface ligand can have an affinity for, or bind selectively to, the core, shell or both at least at one point on the surface ligand. The surface ligand may optionally bind at multiple points along the surface ligand. The surface ligand may optionally contain one or more additional active groups that do not interact specifically with the surface of the core or shell. The surface ligand may be substantially hydrophilic, substantially hydrophobic, or substantially amphiphilic. Examples surface ligand suitable for some embodiments of the present invention include, but are not limited to, an isolated organic molecule, a polymer (or a monomer for a polymerization reaction), an inorganic complex and an extended crystalline structure.

Representative examples of surface ligands suitable for the present embodiments, include, without limitation, alkyls, alkenyls, alkynyls, aromatics and aromatic heterocycles, conjugated aromatics, polyenes, cyanide, alkoxy, carboxylate, phenoxy, siloxy, cyanate, inorganic oxides, thioalkyl, thioaryl, thiocyanate, silylthio, silylamino alicyclic, heteralicyclic, polyols, polyamines, polyalkylene glycols, alkoxysilanes, hydrocarbons, ethers, arbamates, thiocarbamates, sulfoxide, sulfonamine, sulfonamide, sulfate and phosphate. Any of the above substances can be substituted by a substituent such as, but not limited to, hydroxy, amino group and imino group.

In some embodiments of the present invention particle 14 is a quantum dot. When particle 14 comprises a core 20 and a plurality of elongated structures 22, core 20 can be a quantum dot.

As used herein, the term "quantum dot" refers to any particle with size dependent properties (e.g., chemical, optical and electrical properties) along three orthogonal dimensions. A quantum dot can be differentiated from a quantum wire and a quantum well, which have size-dependent properties along at most one dimension and two dimensions, respectively. The quantum dot is typically a semiconductor crystal or nanocrystal having a band gap energy which varies with the diameter of the crystal.

Quantum dots suitable for the present embodiments can have a variety of shapes, including, but not limited to, spheroids, rods, disks, pyramids cubes and a plurality of other classified or unclassified geometric shapes. While these shapes can affect the physical, optical and electronic characteristics of quantum dots, the specific shape does not bear on the qualification of a particle as a quantum dot.

For convenience, the size of quantum dots can be described in terms of a "diameter". In the case of spherically shaped quantum dots, diameter is used as is commonly understood. For non-spherical quantum dots, the term "diameter", unless otherwise defined, refers to twice a radius of revolution (e.g., a smallest or average radius of revolution) in which the entire non-spherical quantum dot would fit.

A quantum dot can comprise a core of one or more first materials and can optionally be surrounded by a shell of a second material. A quantum dot core surrounded by a shell is referred to as a "core-shell" quantum dot. Thus, core 20 can be a core-shell quantum dot.

The term core refers to the inner portion of the quantum dot. A core can substantially include a single homogeneous monoatomic or polyatomic material. A core can be crystalline, polycrystalline or amorphous. A core may be defect free or contain a range of defect densities. In this case, defect can refer to any crystal stacking error, vacancy, insertion, or impurity entity (e.g., a dopant) placed within the material forming the core. Impurities can be atomic or molecular.

While a core may herein be sometimes referred to as "crystalline", it is to be understood that the surface of the core may be polycrystalline or amorphous and that this non-crystalline surface may extend a measurable depth within the core. The potentially non-crystalline nature of this "core-surface region" does not change what is described herein as a substantially crystalline core. The core-surface region optionally contains defects. The core-surface region can range in depth between one and five atomic-layers and may be substantially homogeneous, substantially inhomogeneous or continuously varying as a function of position within the core-surface region.

In embodiments in which the quantum dot comprises a shell, the shall can comprise a layer of material, either organic or inorganic, that covers the surface of the core of a quantum dot. A shell may be crystalline, polycrystalline or amorphous and optionally comprises dopants or defects. In some embodiments of the present invention the refractive index of the shell material is similar the refractive index of the fluid. It was found by the present inventors that such configuration increases the drag forces while maintaining low scattering effect. In some embodiments of the present invention the shell material is an inorganic semiconductor with a bandgap that is larger than that of the core material. A shell may optionally comprise multiple layers of a plurality of materials, such that each material acts as a shell for the next-most inner layer.

The quantum dots optionally and preferably can be made of many types of materials and material combinations. Exemplary materials for use as quantum dots in the present embodiments include, but are not limited to group II-VI, III-V and group IV semiconductors such as ZnS, ZnSe, ZnTe, CdS, CdSe, CdTe, GaN, GaP, GaAs, GaSb, InP, InAs, InSb, AlS, AlP, AlSb, PbS, PbSe, Ge and Si and ternary and quaternary mixtures thereof. In some embodiments of the present invention the quantum dots are CdTe quantum dots.

Quantum dot core and surface ligands suitable for the present embodiments are described in U.S. Pat. Nos. 6,710,366 and 6,114,038, and U.S. Published Application Nos. 20030066998 and 20070295266, the contents of which are hereby incorporated by reference.

The present embodiments contemplate other types of structures for particles 14. For example, in an embodiment of the invention at least some of the particles are branched nanostructures, selected such that the nonlinear interaction results in drag forces which are exerted by the particles on fluid 12, wherein the magnitude of the drag forces is sufficient to establish hydrodynamic flow of fluid medium. representative of branched nanostructures suitable for the present embodiments, include, without limitation, the nanostructures disclosed in U.S. Pat. Nos. 6,325,909, 7,068,898 and 7,220,310. In some embodiments of the present invention at least some of the branched nanostructures are nanotetrapods.

A "nanotetrapod", as used herein refers to a generally tetrahedral branched nanowire having four arms emanating from a central region. The angle between any two arms is approximately 109.5 degrees.

Generally, the size of a particle as indicated below refers to its diameter. If appropriate, a separate value will be used to describe the length of the elongated structures extending from the core of the particle.

Particles 14 can be of micrometric or nanometric size. Preferably, the size of particles 14 is less, e.g., 5 times or 10 times or 20 times or 40 times or 80 times less than the wavelength of the light. In some embodiments of the present invention the size of core 20 is less, e.g., 5 times or 10 times or 20 times or 40 times or 80 times less than the wavelength of the light. Elongated structures 22 are preferably of nanometric size, preferably a few nanometers in length. In some embodiments of the present invention the quantum dots comprise a 3.75 nm CdTe core surrounded by a ligand layer which comprises a plurality surface ligands about 1.8 nm in length.

It will be understood by one of ordinary skill in the art that when referring to a population of particles or elongated structures as being of a particular size, what is meant is that the population is made up of a distribution of sizes around the stated size. Unless otherwise stated, the size used to describe a particular population of particles or elongated structures will be the mode of the size distribution (i.e., the peak size).

Attention will now be given to some advantages and potential applications offered by system 10.

In system 10, light 18 pulls particles 14 towards the high-intensity region of the light beam by virtue of the optical intensity gradient forces. As a result, the density of particles 14 is modified and the refractive-index of the fluid-particles composition varies locally. This process acts like a self-focusing mechanism on light 18. The relatively large changes in the density of particles 14 also modify, in a local fashion, one or more other properties of the fluid-particles composition, such as, but not limited to, surface tension, viscosity, evaporation temperature, convection rate, acidity and the like. The optical intensity gradient forces are transferred to fluid medium 12 due to relatively high drag forces which particles 14 exert on fluid medium 12. In turn, the dynamics of the fluid varies the local distribution of particles 14, thus modulating the local index of refraction and inducing an optical force on light 18. Thus, system 10 exhibits strong coupling between nonlinear optics and nonlinear fluid dynamics.

In some embodiments of the present invention system 10 manipulate fluid medium 12 substantially without heating the fluid. Preferable, the heat transfer between light and the fluid medium is below 2° C. This embodiment is readily achieved when particles 14 are quantum dots, because quantum dots are generally isolated from "phonon coupling" through an effect known as "phonon bottleneck".

System 10 can manipulate many types of fluids, liquids or gasses. Generally, any type of fluid in which the structure of particle 14 is stable can be used. Representative examples including, without limitation, octadecene liquid, water and organic liquids such as ethanol, methanol, xylene and the like. In various exemplary embodiments of the invention the surface ligands are selected in accordance with the type of fluid. Generally, it is preferred to have surface ligands which resist the fluid, hence increase the drag forces.

System 10 can be used for locally controlling the concentration of particles 14. This embodiment is particularly useful in chemical or biological assays. For example, particles 14 can be coated with catalysts, and light 18 can be used for increasing or reducing the density of particles at a predetermined region within fluid medium 12, thereby to control the rate of chemical reaction. When fluid medium comprises electrolyte, light 18 can locally modify the concentration of electrolyte.

System 10 can also be used for controlling self assembly processes. In these embodiments, at least a few of particles 14 are capable of self assembling, and light 18 locally controls the concentration of particles 14 thereby controlling self assembly structures formed by particles 14.

System 10 can also be used for controlling local concentration of gaseous bubbles present in a liquid medium. The gaseous bubbles can be in addition to particles 14 or they can replace particles 14. It was found by the present inventors that a gaseous bubble can be subjected to an optical intensity gradient force at a magnitude which is sufficient to generate locomotion of the bubble and optionally manipulate the liquid via drag forces applied by the bubbles on the liquid. Typically, the refractive index of the bubble is lower than the refractive index of the liquid. Thus, the nonlinear interaction between the light and the bubble result in repulsive gradient forces, whereby the bubble moves away from the light.

System 10 can also be used for forming a predetermined three-dimensional particles concentration pattern within the fluid. The predetermined three-dimensional pattern can be inputted from a computer readable medium to a controller 24 which controls the operation of light source 16 to irradiate fluid medium 12 in accordance with the inputted pattern.

Figure 2:
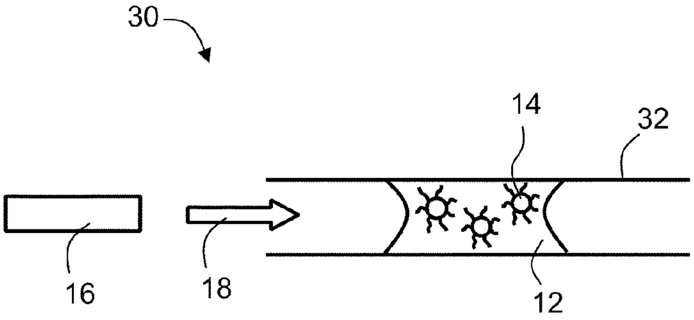

In some embodiments of the present invention, system 10 is employed for manipulating a liquid in a channel. In these embodiments, the drag forces are sufficient for establishing locomotion of a liquid drop in the channel. For example, system 10 can be employed in a microfluidic system 30, as schematically illustrated in FIG. 2. System 30 can comprise one or more microchannels 32, and light source 16 of system 10. The liquid drop 12 containing particles 14 is located within microchannels 32. Light 18 nonlinearly interacts with particles 14 and exerts optical intensity gradient forces on particles 14 which in tern exert drag forces on liquid drop 12. The drag forces are sufficient for establishing locomotion of liquid drop 12 in microchannel 32.

Microfluidic system 30 can be used in many fields, include, without limitation, medical diagnostics, environmental monitoring, biological food testing, chemical sensing and analysis, and the like. For example, system 30 can be used for mixing fluidic reagents, assaying products resulting from such mixtures and separation or purification of products or reagents. System 30 can also be used for microfluidic printing. In these embodiments, liquid 12 comprise ink.

System 10 can also be used for inducing surface waves or density waves within fluid medium 12. Surface waves and localized waves which propagate at the interface between two media with different optical properties. For example, system 10 can induce capillary surface waves which travel on the surface of a liquid in a regime where the surface tension of the liquid dominates the gravitational forces. Such surface waves are useful in the industry because of their periodicity and their relatively short wavelengths. In nozzleless liquid ink printing, for example, the surface waves can be used to provide resolution which is well beyond the range of resolutions within which non-impact printers normally operate.

System 10 can also be used for inducing turbulence in the fluid. This is particularly useful for to enhance mixing within fluid medium 12, e.g., in chemical assays. Although the mixing of fluids is fundamentally governed by molecular diffusion, turbulence in the flow can enhance mixing by many orders of magnitude. Greater turbulence in the flow field can increase reactant area and reduce reaction times.

System 10 can also be used for modifying osmotic pressure at the vicinity of a biological or artificial membrane present in the fluid medium. Such modification can be exploited to optimize the operation of membranes.

System 10 can also be used for controlling surface fabrication processes. The surface is placed in fluid medium 12 which is then irradiated by light 18 so as to control the local concentration of particles 14 in fluid medium 12. Such control can be used to locally treat the surface (e.g., polishing, etching, etc.).

System 10 can also be used for generating a soliton light beam. Soliton light beams are beams of light that never diffract and are capable of interact with each other. A soliton light beam can be generated by modifying the refractive index of the fluid-particles composition and guiding the light beams such that at least a portion of light exits the fluid medium as a soliton light beam. The soliton light beam can be a spatial soliton light beam or a spatio-temporal soliton light beam. Soliton light beams produced by this technique can also be used for manipulating fluid media. Specifically, the soliton light beams can be directed to a fluid medium having therein a plurality of particles (e.g., particles 14) so as to locally modify the density of the particles hence also the refractive-index of the fluid-particles composition. The change in the density of the particles locally modifies the surface tension, viscosity, evaporation temperature, convection rate or acidity of the fluid medium.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", an and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Following is a description of an experimental study of a complex system in which the optical propagation, density distribution of the particles, and fluid dynamics are coupled, giving rise to new fundamental kind of dynamics.

The study begins with a basic dynamic of linear beam propagation with angular momentum. The angular momentum is transferred to the liquid resulting laminar angular flow. In turn, the flow rotates the beam, thus restoring part of its angular momentum.

The study continues with a more complex dynamics, including chaos, multi stability and semi periodic dynamics between light beam and surface waves of the liquid.

The experimental setup included dielectric nanoparticles with a high refractive-index suspended in a liquid with a low refractive-index, in accordance with some embodiments of the present invention. The liquid was a Octadecene liquid with a refractive index of 1.47. The nanoparticles included a core surrounded by a ligand layer of elongated surface ligands extending away from the cores. The cores were CdTe quantum dot cores with diameter of 3.75 nm. The surface ligands were 1.8 nm in length. The refractive index of the quantum dots core was 2.75. The concentration of the particles in the liquid was of the order of $4\cdot10^{16}$ particles per cubic centimeter, corresponding to a 0.05% volume concentration.

The experimental setup further included a light source, in accordance with some embodiments of the present invention. The light source was a Verdi laser, which is Nd:Yag laser multiplied frequency. The wavelength is of the light was 532 nm and the power was tunable from zero to 10 Watt.

The focused light beam modifies the density of the nanoparticles (pulling them towards the high-intensity region of the beam) by virtue of intensity gradient forces, thereby increasing the local refractive-index of the solution. This process acts like a self-focusing mechanism on the optical beam. The changes in the nanoparticles density locally modify the properties of the complex liquid. The optical forces are transferred to the liquid due to drag forces on the nanoparticles, which in turn modify the optical properties of the complex liquid (changing the local refractive index) and vice-versa. That is, the dynamics of the fluid changes the local distribution of nanoparticles, thus modulating the local index of refraction and inducing an optical force on the light beam. The experimental setup inherently exhibits strong coupling between nonlinear optics and nonlinear fluid dynamics.

FIG. 3A illustrates the optical intensity gradient force. As illustrated, the gradient force pushes the particles to the beam center. The self-focusing is illustrated in FIG. 3B. At low power, the variation in particle concentration is very small and the effective refractive index change is negligible, leading to linear diffraction of the optical beam. On the other hand, at high power the particles accumulate at the beam center, thereby increasing the effective refractive index there, resulting in strong self-focusing.

An experimental TEM photograph of the dielectric nanoparticles is shown in FIG. 3C.

Example 1

In this exemplified experiment, a spiral intensity structure was induced by interfering vortex beam with spherical phase front. The relative phase between the vortex and the spherical phase fronts was controlled by passing the vortex beam through a nano-motion step-motor. The beam was focused on the liquid media and the relative phase was varied linearly, such that the dynamic intensity structure was a rotating spiral.

After a few seconds an angular velocity of the fluid in the cell was observed. Air bubbles were added to observe the velocity distribution in the cell. Following termination of the operation of the motor, the liquid continue to rotate due to inertia forces, but the center of rotation shifted from the beam center to the center of the cell.

The rotation induced radial change in the nanoparticles density distribution, which rotated the beam in the cell. Relaxation was observed after 20 seconds.

Example 2

In this exemplified set of experiments, light-induced surface tension effects were investigated.

A vertical pipette with inner hollow diameter of 0.7 micron was connected to a bath filled with suspension of the nanoparticles in Octadecence as described above. The height level of the liquid-particles composition in the pipette is a function of the surface tension.

The light beam was directed to the pipette at some distance from the liquid-air surface. The power of the beam was varied from about 0.3 mWatt to about 400 mWatt. The beam diameter was about 1 mm. The experiment demonstrated the effect of light intensity on the height of liquid within the pipette. At low intensity the liquid level was high and at higher intensities the liquid level was low. An overall reduction of about 2 mm in the height of the liquid was observed. The experiment further demonstrated the effect of the distance between the beam and the liquid-air surface on the height of liquid within the pipette. The height of liquid is reduced when the distance between the liquid-air surface and the beam is sufficiently short. Thus, the optical beam controlled the surface tension of the fluid.

FIGS. 4A-D and 5A-C are images taken at various stages of the experiments.

Figure 4A:
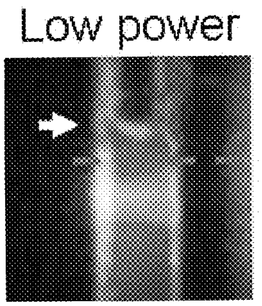
Figure 4B:
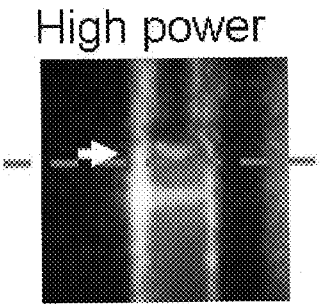
Figure 4C:
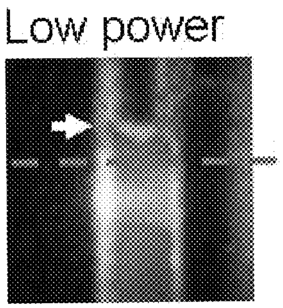
Figure 4D:
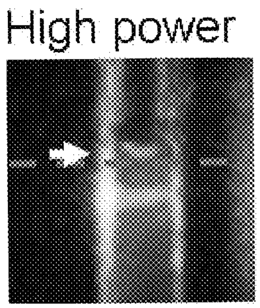

FIGS. 4A-D demonstrate the effect of light intensity on the height of liquid within the pipette. FIGS. 4A and 4C show the reduction of liquid height at high laser power (about 300-400 mWatt). FIGS. 4B and 4D show a higher liquid height at low laser power (about 10 mWatt). The light trajectory is illustrated by a dashed line.

FIGS. 5A-C demonstrate the effect of the distance between the beam and the liquid-air surface on the height of liquid within the pipette.

In FIG. 5A, the beam is launched at about 300 microns from the liquid-air surface. The light undergoes self-focusing because the particles are attracted to the beam center. The beam trajectory is bent downwards due to gravitation which creates a density gradient in the vertical direction. At this distance, there is no interaction with the surface and the height level of the liquid remains unchanged.

In FIG. 5B, the beam is at about 100 microns from the liquid-air surface. The light attracts particles from the surface of the liquid towards the beam center, thereby deforming the surface of the liquid. Higher particle concentration near the surface pulls the beam, thereby partially counteracting the gravitational downward bending. Consequently, the bending of the beam is less pronounced than the bending depicted in FIG. 5A.

In FIG. 5B, the beam is less than 100 microns from the liquid-air surface. More particles move from the surface towards the beam making the surface very deformed. As shown the surface is curved towards the beam in an asymmetric fashion. The trajectory of the beam is almost completely straightened since the gravitational effect is almost fully compensated. The now straightened trajectory of the beam now meets the highly curved liquid-air surface, and undergoes total internal reflection. Up to this point, surface tension holds the surface deformation, in spite the reduced particle density at surface. However, the optically-induced reduction in the density of nano-particles at the surface reduces surface tension, until a break point occurs. At the breakpoint, surface tension is reduced to the point at which it fails to support the deformation of the surface. Consequently, the surface collapses into a symmetric profile, where the distance between the beam and the surface increases. At this stage, the system starts to evolve again resulting in self-oscillation.

FIG. 6 is a plot demonstrating the self-oscillation effect. When the beam is launched about 5 μm above the threshold distance, closer to the surface, oscillation occurs slowly (second curve from the bottom). When the beam is launched closer to the surface, 10, 15 μm above the threshold distance, the oscillation frequency monotonically increases (third and fourth curve from the bottom, respectively). It is noted that the entire process is initiated by light and is fully controlled by light alone.

Example 3

In this exemplified experiment, optical locomotion of a liquid drop was investigated. The Experiment is shown in FIG. 7. An interference pattern between a Gaussian beam and vortex a beam (made by constructing a spiral mirror with micro-electronics technique) was used to construct an intensity structure that spirals about its center (upper left panel of FIG. 7).

When the vortex mask was positioned on top of a motor at constant speed, the spiral intensity structure was rotating around its axis at a constant angular velocity. The spiraling beam was focused on a liquid droplet inside a horizontal pipette (upper right and lower panels of FIG. 7). The beam power was 600 mWatt and the wait of the focused beam is about 10 micron. A clockwise rotating beam pulled the droplet, whereas a counterclockwise rotating beam pushed the droplet away. It was found by the present inventors that a Gaussian beam without the screw structure can also pull and push a liquid drop in the direction of the focus point. This is due to the intensity gradient of light which induces force in the direction of the focal point.

Example 4

This experiment is directed to the investigation of the light beam emerging out of the liquid, particularly the generation of sub-wavelength solitons. A rough estimate on the nonlinear index change required to support sub-wavelength solitons is about 0.1-0.2, which has not yet been observed in inorganic solids. The optical intensity gradient force exerted on our the nanoparticles of the present embodiments, can reach these values, and its resolution is at the nanometer scale. It was found by the present inventors that with a sufficiently high densities (e.g, 1-4%), sub-wavelength soliton can be generated. Preferably, the particles are sufficiently small in size so as to reduce or minimize Rayleigh scattering.

FIGS. 8A-D are images depicting an optical beam emerging from the liquid-particles composition.

Figures 8A, 8B, 8C, 8D:
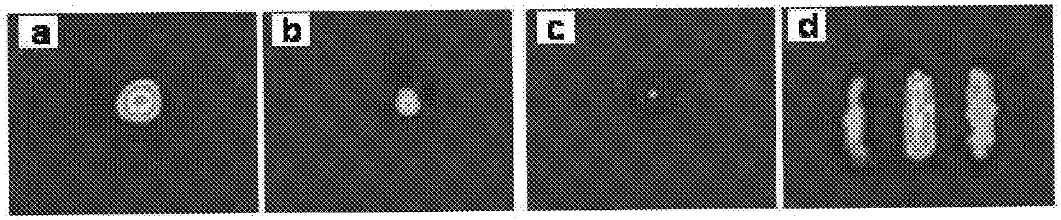

FIG. 8A shows the output beam at low power after 100 microns propagation. The beam Full Width at Half Maximum (FWHM) is about 5 micron. FIG. 8A shows the output beam at 200 mWatt optical power. The beam self-focuses to about 3 microns FWHM. FIG. 8C shows the output beam at high power of about 1 Watt. The image of the output beam depicts a central spot surrounded by a ring. The central spot has a FWHM of about 1.3 microns, which is the narrowest spot the imaging system can yield. The rings surrounding the self-focused beam indicate that the experiment have reached the diffraction limit of the imaging system. These rings are produced by the aperture of the lens, and their strength indicates that a considerable portion of the power is carried by waves propagating at angles beyond the maximum angle collected by the lens. The lens aperture acts as a low pass filter of the image. This image demonstrates that the output beam has self-focused to a spot much smaller than 1.3 microns width. FIG. 8D shows the smallest feature of the resolution target, where the length of the lines is 11.2 microns.

The results presented above demonstrate that the conditions for generating solitons and sub-wavelength soliton can be fulfilled using the techniques of the present embodiments.

REFERENCES

1. G. G. Hammes, Thermodynamics and Kinetics for the Biological Sciences, (John Wiley and Sons 2000).
2. P. W. Smith, A. Ashkin and W. J. Tomlinson, Opt. Lett. 6, 284 (1981).
3. A. Ashkin, J. M. Dziedzic and P. W. Smith, Opt. Lett. 7, 276 (1982).
4. V. E. Yashin, et al.," Opt Spectrosc. 98, 466 (2005).
5. P. J. Reece, et al., Phys. Rev. Lett. 98, 203902 (2007).
6. J. P. Gordon," Phys. Rev. A 8, 14-21 (1973).
7. A. Ashkin, et al., Opt. Lett. 11, 288 (1986).
8. S. Stenholm, Rev. Mod. Phys. 58, 699-739 (1986).
9. C. Conti, G. Ruocco and S. Trillo, Phys. Rev. Lett. 95, 183902 (2005).
10. C. Conti, N. Ghofraniha, G. Ruocco and S. Trillo, Phys. Rev. Lett. 97, 123903 (2006).
11. R. El-Ganainy, K. G. Makris, D. N. Christodoulides, C. Rothchild, and M. Segev, Opt. Exp. 15, 10207 (2007).
12. R. El-Ganainy, D. N. Christodoulides, C. Rothchild, and M. Segev, Opt. Lett. 32, 3185 (2007).
13. R. Gordon, J. T. Blakely and D. Sinton, Phys. Rev. A. 75 055801 (2007).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for manipulating a fluid medium, comprising:

a plurality of particles suspended in the fluid medium, said particles being made of a dielectric material characterized by a refractive index which is different from a refractive index of said fluid medium, and a light source configured for irradiating said particles by light to induce nonlinear optical effects, said particles being constituted such that said nonlinear optical effects result in drag forces exerted by said particles on said fluid medium at a magnitude which is sufficient to establish hydrodynamic flow of said fluid medium.

2. A method of manipulating a fluid medium, comprising irradiating particles suspended in the fluid medium by light to induce nonlinear optical effects, said particles being made of a dielectric material characterized by a refractive index which is different from a refractive index of said fluid medium, and being constituted such that said nonlinear optical effects result in drag forces exerted by said particles on said fluid medium at a magnitude which is sufficient to establish hydrodynamic flow of said fluid medium.

3. The system claim 1, wherein at least a few of said particles have a surface area which is at least 2 times larger than a surface area of a sphere occupying the same volume.

4. The system claim 1, wherein at least a few of said particles comprise a core and a plurality of elongated structures extending from said core.

5. The system of claim 4, wherein said plurality of elongated structures form a ligand layer surrounding said core.

6. The system of claim 1, wherein said particles comprise quantum dots.

7. The system of claim 1, drag forces are sufficient for varying a level of the fluid in a micropipette by at least 1 mm.

8. The system of claim 1, wherein at least a few of said particles are coated by a catalyst.

9. The system of claim 1, wherein at least a few of said particles are capable of self assembling, and said light locally controls a concentration of said particles thereby controlling self assembly structures formed by said particles.

10. The system of claim 1, wherein said light locally modifies at least one property of: a surface tension, a viscosity, an evaporation temperature, a convection rate and acidity of the fluid medium.

11. The system of claim 1, wherein the fluid medium comprises electrolyte and said light locally modifies a concentration of said electrolyte.

12. The system of claim 1, wherein said light induces surface waves or density waves within the fluid medium.

13. The system of claim 1, wherein said light induces turbulence in the fluid.

14. The system of claim 1, wherein said light modifies osmotic pressure at the vicinity of a membrane present in the fluid medium.

15. The system of claim 14, wherein said membrane is a biological membrane.

16. The system of claim 14, wherein said membrane is an artificial membrane.

17. The system of claim 1, wherein a heat transfer between said light and the fluid medium is below 2 degrees centigrade.

18. The system of claim 1, wherein the fluid is liquid.

19. The system of claim 18, wherein said liquid is a liquid drop in a channel, and said drag forces are sufficient for establishing locomotion of said liquid drop in said channel.

20. The system of claim 18, wherein said light modifies local concentration of gaseous bubbles present in the fluid medium.

21. The system of claim 1, wherein said fluid is gas.

22. The system of claim 1, wherein said light forms a predetermined three-dimensional particles concentration pattern within the fluid, said pattern being inputted from a computer readable medium.

23. A method of controlling a chemical reaction, comprises introducing chemical agents into a fluid medium, and executing the method of claim 2 so as to modify a rate of chemical reactions between said chemical agents.

24. A method of controlling surface fabrication processes, comprising placing the surface in a fluid medium and executing the method of claim 2 so as to control a local concentration of particles suspended in said fluid medium.

25. A method of generating a soliton light beam, comprising executing the method of claim 2 in a manner such that at least a portion of said light exits the fluid medium as a soliton light beam.

26. The method of claim 25, wherein said soliton light beam is a spatial soliton light beam.

27. The method of claim 25, wherein said soliton light beam is a spatio-temporal soliton light beam.

28. A microfluidic system comprising at least one microchannel and the system of claim 1, wherein said drag forces are sufficient for establishing locomotion of a liquid drop in said at least one microchannel.

29. A system, comprising:

a liquid medium which comprises liquid and gaseous bubbles, and a light source configured for irradiating said gaseous bubbles by light to induce optical intensity gradient forces via nonlinear optical effects, said optical gradient forces being sufficient to establish locomotion of said gaseous bubbles within said liquid.

30. A method, comprising irradiating a liquid medium which comprises liquid and gaseous bubbles by light to induce optical gradient forces via nonlinear optical effects, said optical gradient forces being sufficient to establish locomotion of said gaseous bubbles within said liquid.

31. The system of claim 1, wherein said nonlinear optical effects result in drag forces exerted by said gaseous bubbles on said liquid at a magnitude which is sufficient to establish hydrodynamic flow of said liquid.

* * * * *